United States Patent
Yamazaki et al.

(10) Patent No.: US 8,387,880 B2
(45) Date of Patent: Mar. 5, 2013

(54) IMAGING APPARATUS FOR READING INFORMATION

(75) Inventors: Kozo Yamazaki, Inagi (JP); Isao Iwaguchi, Inagi (JP)

(73) Assignee: Fujitsu Frontech Limited, Tokyo (JP)

(*) Notice: Subject to any disclaimer, the term of this patent is extended or adjusted under 35 U.S.C. 154(b) by 583 days.

(21) Appl. No.: 12/568,117

(22) Filed: Sep. 28, 2009

(65) Prior Publication Data

US 2010/0079825 A1   Apr. 1, 2010

(30) Foreign Application Priority Data

Sep. 30, 2008 (JP) .................................. 2008-254850

(51) Int. Cl.
H04N 1/04 (2006.01)

(52) U.S. Cl. ........................................ 235/454; 358/474

(58) Field of Classification Search .................. 235/454; 358/474
See application file for complete search history.

(56) References Cited

U.S. PATENT DOCUMENTS

| | | | |
|---|---|---|---|
| 5,473,149 A | 12/1995 | Miwa et al. | |
| 5,541,779 A | 7/1996 | Choi | |
| 5,978,021 A | 11/1999 | Kim | |
| 2004/0008339 A1* | 1/2004 | Koishi et al. | 356/153 |
| 2006/0018647 A1* | 1/2006 | Iwanaga | 396/55 |
| 2006/0127072 A1 | 6/2006 | Seo | |
| 2008/0012969 A1 | 1/2008 | Kasai et al. | |
| 2008/0037085 A1 | 2/2008 | Gabor et al. | |

FOREIGN PATENT DOCUMENTS

| | | |
|---|---|---|
| CN | 1116720 A | 2/1996 |
| JP | 06-022207 | 1/1994 |
| JP | A 6-70225 | 3/1994 |
| JP | 08-114769 | 5/1996 |
| JP | 08-242403 | 9/1996 |
| JP | A 9-51484 | 2/1997 |
| JP | 09-083858 | 3/1997 |
| JP | 10-178578 | 6/1998 |
| JP | B2 3150502 | 3/2001 |
| JP | 2003-050991 | 2/2003 |
| JP | A 2004-48266 | 2/2004 |

(Continued)

OTHER PUBLICATIONS

Office Action issued by the Korean Intellectual Property Office mailed Dec. 30, 2010, for corresponding Korean Patent Application No. 10-2009-91588.

(Continued)

*Primary Examiner* — Allyson Trail
(74) *Attorney, Agent, or Firm* — Greer, Burns & Crain, Ltd.

(57) ABSTRACT

A position Z of an image sensor is moved to an initial position A (image forming position) in a Z axis direction. An exposing operation is performed at a position A, and it is determined whether or not an exposing time counted by a timer has reached ta. If the exposing time has reached ta, an image sensor 27 is moved to a position B. The exposing operation is performed at the position, and it is determined whether or not a total exposing time has reached ta+tb. If the total exposing time t has reached ta+tb, the image sensor is moved to a position C, and the exposing operation is performed at the position. Thus, the output distribution of the image sensor can be assigned a desired low pass filter characteristic.

7 Claims, 15 Drawing Sheets

FOREIGN PATENT DOCUMENTS

| | | |
|---|---|---|
| JP | 2005-266096 | 9/2005 |
| JP | A 2006-171286 | 6/2006 |
| JP | 2007-081544 | 3/2007 |
| JP | A 2007-97049 | 4/2007 |
| JP | A 2007-102062 | 4/2007 |
| JP | 2007-166155 | 6/2007 |
| JP | 2007-306447 | 11/2007 |
| JP | 2008-035241 | 2/2008 |
| JP | 2008-225158 | 9/2008 |
| KR | 10-2004-0033964 | 4/2004 |

OTHER PUBLICATIONS

Notice of Rejection Grounds dated Jan. 31, 2012 issued by the Japanese Patent Office in corresponding Japanese Application No. 2008-254850.

Office Action issued by the Chinese Patent Office in co-pending Chinese Patent Application No. 200910177188.6, mailed May 19, 2011.

Office Action issued by the Korean Intellectual Property Office mailed Jan. 20, 2011, for corresponding Korean Patent Application No. 10-2009-91586.

Notice of Rejection issued by the Japanese Patent Office in corresponding Japanese Application No. 2008-254856, dated Nov. 22, 2011.

Office action issued in U.S. Appl. No. 12/568,047, mailed May 18, 2012.

Final Office Action issued in corresponding U.S. Appl. No. 12/568,047, mailed Oct. 15, 2012.

Notice of Rejection Ground mailed Nov. 6, 2012 issued by the Japanese Patent Office in corresponding Japanese Patent Application No. 2008-254850 (with partial English translation).

* cited by examiner

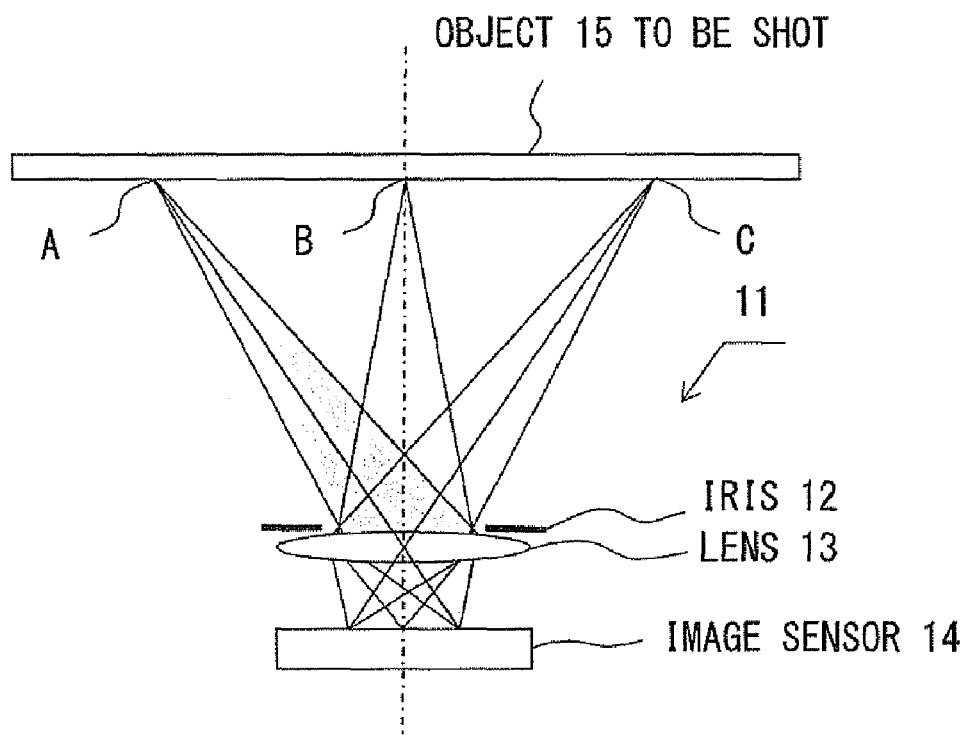
F I G. 1

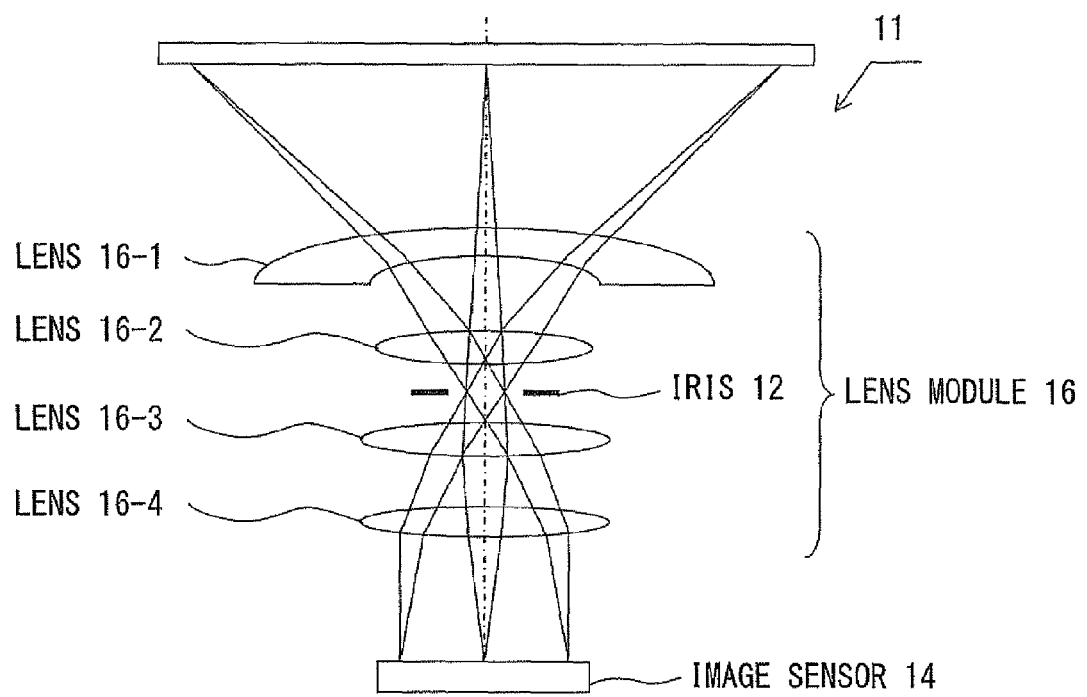
F I G. 2

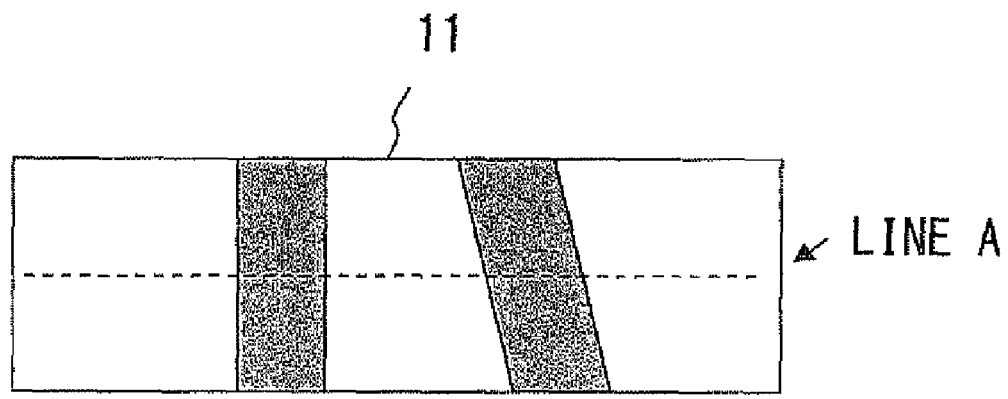
F I G. 3 A
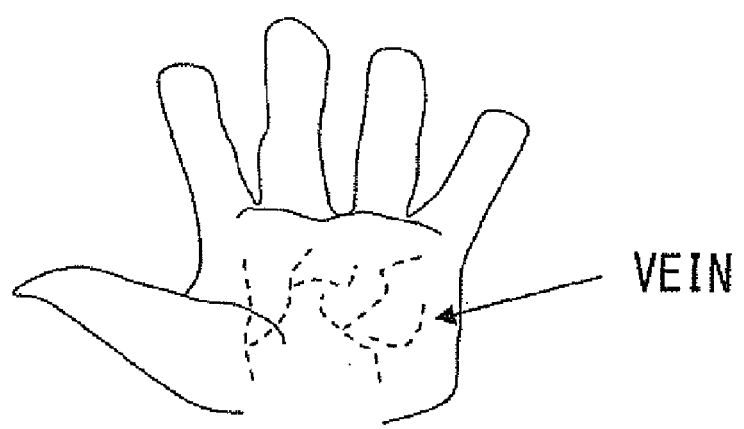
F I G. 3 B

|     | a-2 | a-1   | a     | a+1   | a+2 |
|-----|-----|-------|-------|-------|-----|
| b+2 | 0   | 0     | 0     | 0     | 0   |
| b+1 | 0   | 0.063 | 0.125 | 0.063 | 0   |
| b   | 0   | 0.125 | 0.25  | 0.125 | 0   |
| b-1 | 0   | 0.063 | 0.125 | 0.063 | 0   |
| b-2 | 0   | 0     | 0     | 0     | 0   |

$Q(a,b) = 0.063*P(a-1,b+1) + 0.125*P(a,b+1) + 0.063*P(a+1,b+1)$
$\quad + 0.125*P(a-1,b) + 0.25*P(a,b) + 0.125*P(a+1,b)$
$\quad + 0.063*P(a-1,b-1) + 0.125*P(a,b-1) + 0.063*P(a+1,b-1)$ WHERE P INDICATES VALUE OF ACQUIRED PIXEL, AND Q INDICATES OUTPUT AFTER ARITHMETIC OPERATION

FIG. 6A

|     | a-2 | a-1   | a     | a+1   | a+2 |
|-----|-----|-------|-------|-------|-----|
| b+2 | 0   | 0     | 0     | 0     | 0   |
| b+1 | 0   | 0.111 | 0.111 | 0.111 | 0   |
| b   | 0   | 0.111 | 0.111 | 0.111 | 0   |
| b-1 | 0   | 0.111 | 0.111 | 0.111 | 0   |
| b-2 | 0   | 0     | 0     | 0     | 0   |

FIG. 6B

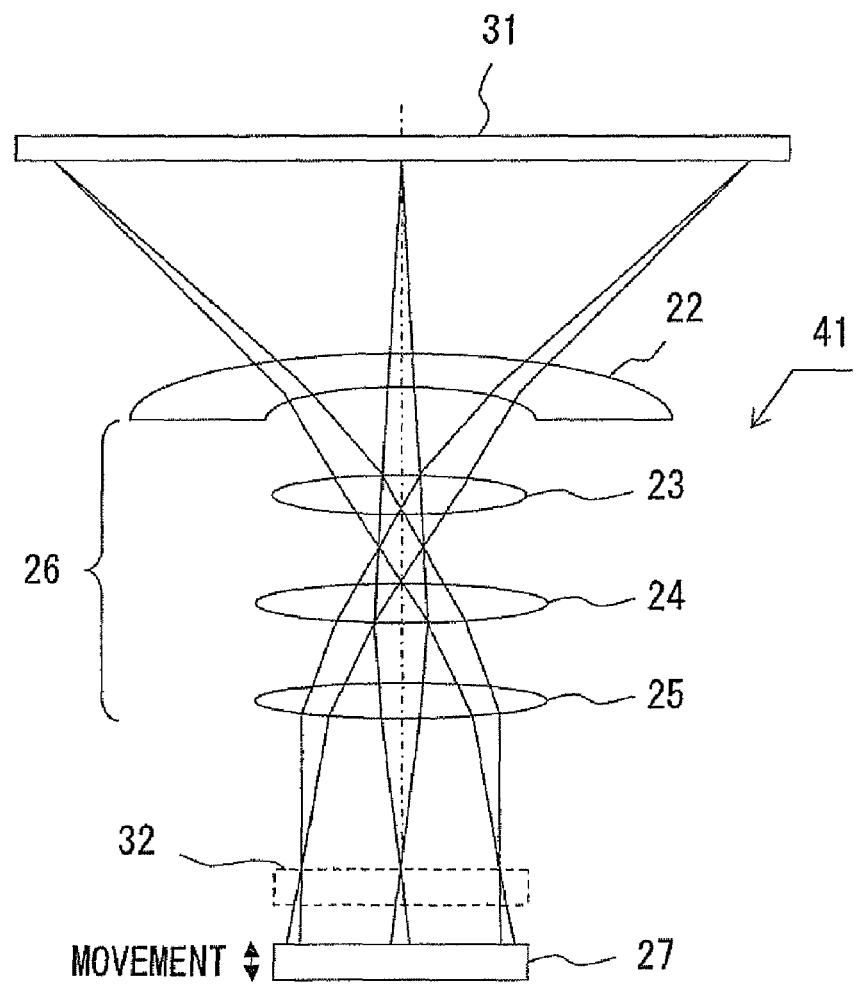
F I G. 8

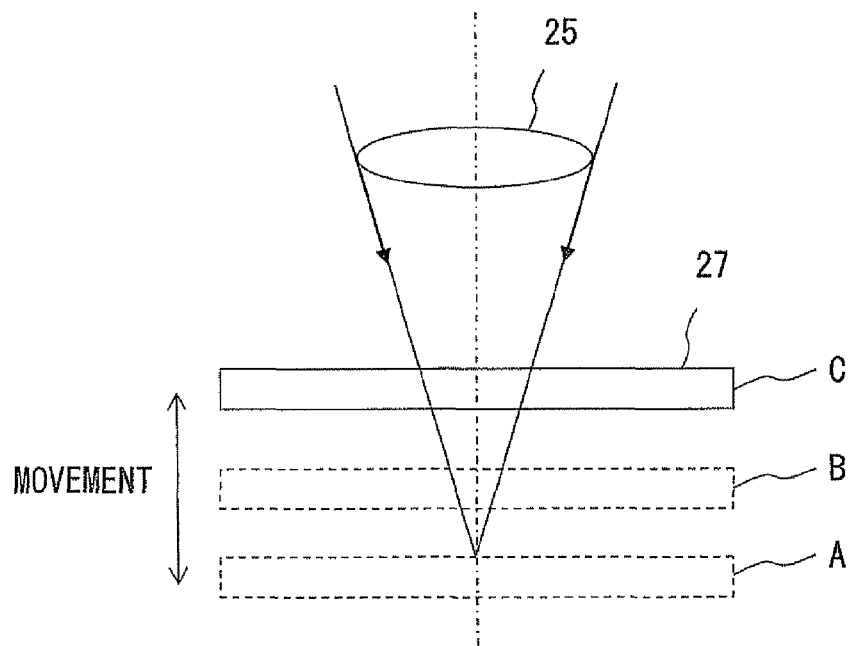
F I G. 9A
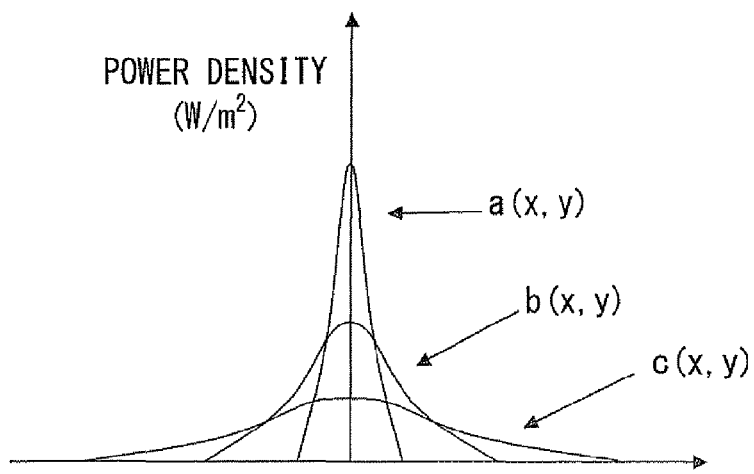
F I G. 9B

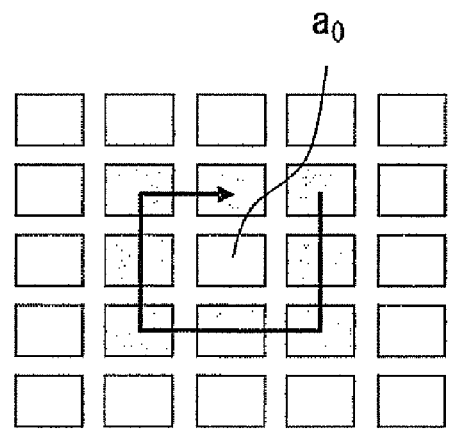
F I G. 1 4 A
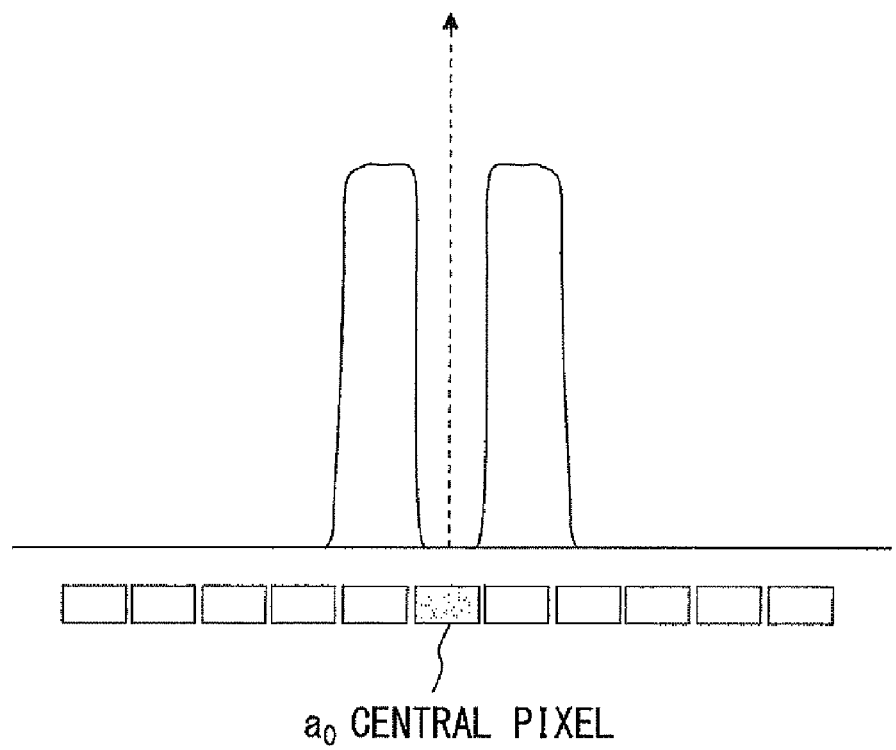
F I G. 1 4 B

IMAGING APPARATUS FOR READING INFORMATION

FIELD OF THE INVENTION

The present invention relates to an imaging apparatus for reading information from an object.

DESCRIPTION OF THE RELATED ART

An imaging apparatus is used to read information printed on a medium such as a paper sheet, or information on a live body. FIGS. 1 and 2 illustrate the configurations of the optical system of an imaging apparatus 11 for reading information, such as a bar code printed on a paper sheet etc.

As illustrated in FIGS. 1 and 2, the imaging apparatus 11 has an iris 12, a lens 13 (or a lens module 16), and an image sensor 14.

The optical path of the light reflected by an object 15 to be shot is limited by the iris 12, and the light is received by the image sensor 14 through the lens 13.

When the information printed on a medium is read by the imaging apparatus 11, the distance between the lens 13 and the image sensor 14 is adjusted, so that the image forming surface is matched to the surface of the image sensor 14, thereby acquiring a clear image.

However, while a clear image has a large information volume, a change of a signal by the coarseness of the surface of a medium is superposed as noise on an original image signal.

FIGS. 3A and 3B are examples of the object 15 to be shot. When a pattern printed on a paper sheet etc. as illustrated in FIG. 3A is read by the imaging apparatus 11, a change of a signal by coarseness of the paper surface can get on an original image signal as noise.

When the vein inside the palm of a hand as illustrated in FIG. 3B is read, the scattered light from the organization of the living body around the vein also gets on the original image signal as noise. Therefore, it is necessary to remove noise by performing an operation for low pass filter (LPF) processing etc.

FIG. 4A illustrates an image signal of an arbitrary line (for example, a line A illustrated in FIG. 3A) of an object to be shot, on which the noise is superposed. FIG. 4B illustrates an image signal after the noise is removed by low pass filter (LPF) processing.

FIG. 5 illustrates the output of the image sensor 14 of a conventional imaging apparatus. FIG. 5 illustrates the distribution of a level of an output signal of the point image on the image sensor 14 corresponding to an arbitrary point on an object to be shot, and the image forming surface matches the sensor surface to obtain a clear image. Therefore, the distribution of the level of an output signal indicates a waveform of the substantial concentration on one pixel.

As described above, the clearer an image obtained by the imaging apparatus 11 is, the higher frequency noise gets on an image signal by the coarseness of the surface of a medium.

To solve the problem, conventional techniques perform an operation of low pass filter processing on an image signal output from the image sensor 14 to remove the high frequency noise.

FIGS. 6A and 6B illustrate the operation matrix of a Gaussian filter and a moving average filter used in the low pass filter processing.

The 3×3 operation matrix illustrated in FIG. 6A is described below. The target pixel Q (a, b) is calculated as a sum of a value obtained by multiplying the upper left pixel data P (a−1, b+1) by "0.063", a value obtained by multiplying the upper pixel data P (a, b+1) by "0.125", a value obtained by multiplying the upper right pixel data P (a+1, b+1) by "0.063", a value obtained by multiplying the left adjacent pixel data P (a−1, b) by "0.125", a value obtained by multiplying the pixel data P (a, b) by "0.25", a value obtained by multiplying the right adjacent pixel data P (a+1, b) by "0.125", a value obtained by multiplying the lower left pixel data P (a−1, b−1) by "0.063", a value obtained by multiplying the lower pixel data P (a, b−1) by "0.125", a value obtained by multiplying the lower right pixel data P (a+1, b−1) by "0.063".

An image signal treated by the Gaussian filter processing can be obtained by performing the above-mentioned operation on each pixel.

Similarly, the operation matrix illustrated in FIG. 6B is performed, that is, an image signal treated by the moving average filter processing can be obtained by multiplying a target pixel and its peripheral pixels by the value of the operation matrix illustrated in FIG. 6B.

However, it is necessary to perform the operation for the number of elements of the operation matrix (for example, nine times for the 3×3 matrix) on all pixels read by the imaging apparatus in the low pass filter processing using the above-mentioned operation matrix. When there are a large number of pixels, the processing time of image processing becomes long.

The patent document 1 describes preventing an occurrence of moiré of an image by defocusing the reflected light of an original formed on an image sensor.

The patent document 2 describes a drive mechanism of a camera in which an AF coil is fixed to a moving object for supporting an image pickup element, and the AF coil is a plane coil positioned on the plane on which parallel to an optical axis.

The patent document 3 describes an imaging unit including a moving device for moving an imaging device in an arbitrary direction on a plane perpendicular to a subject light, and a position detection device for detecting the position of the imaging device.

The patent document 4 describes an imaging apparatus having a camera shake correction function including a shooting optical axis as a Z axis direction with an intersection between an X-Y plane perpendicular to the Z axis direction and the Z axis defined as an origin, and an origin position forcibly holding mechanism for mechanically holding an image pickup element at an origin position where an optical center of the image pickup element matches the origin.

The above-mentioned patent documents do not describe performing a desired filtering process on an image without increasing the processing time of image processing.

[Patent Document 1] Japanese Laid-open Patent Publication No. 2007-097049

[Patent Document 2] Japanese Laid-open Patent Publication No. 2006-171286

[Patent Document 3] Japanese Patent Publication No. 3956787

[Patent Document 4] Japanese Laid-open Patent Publication No. 2007-102062

SUMMARY OF THE INVENTION

The present invention aims at performing a desired filtering process on an image in a shorter time in an imaging apparatus for reading information.

The imaging apparatus for reading information according to the present invention includes a lens for forming an image of the light from an object to be shot, an image sensor for receiving the light from which an image is formed by the lens, a drive unit for changing the position of the image sensor so that the resultant exposure energy distribution of received light on each pixel of the image sensor can be the low pass filter characteristic, and a control unit for controlling the drive unit.

Since the imaging apparatus for reading information requires no low pass filter operation, the processing time for the image processing can be shortened.

BRIEF DESCRIPTION OF THE DRAWINGS

FIG. 1 illustrates a configuration of an imaging optical system;

FIG. 2 illustrates another configuration of an imaging optical system;

FIGS. 3A and 3B are examples of an object to be shot;

FIGS. 6A and 6B illustrate an operation matrix of a Gaussian filter and a moving average filter;

FIG. 8 illustrates a configuration of the imaging apparatus according to the second embodiment of the present invention;

FIGS. 9A and 9B illustrate the relationship between the position of an image sensor and an image forming position, and the power density of the vicinity of the target point;

FIGS. 14A and 14B illustrate the XY moving control and the characteristic of a singular point removal filter when a singular point is removed.

DESCRIPTION OF THE PREFERRED EMBODIMENTS

Figure 4A:
FIGS. 4A and 4B illustrate an image signal on which noise is superposed and an image signal after LPF processing.
Figure 4B:
Figure 5:
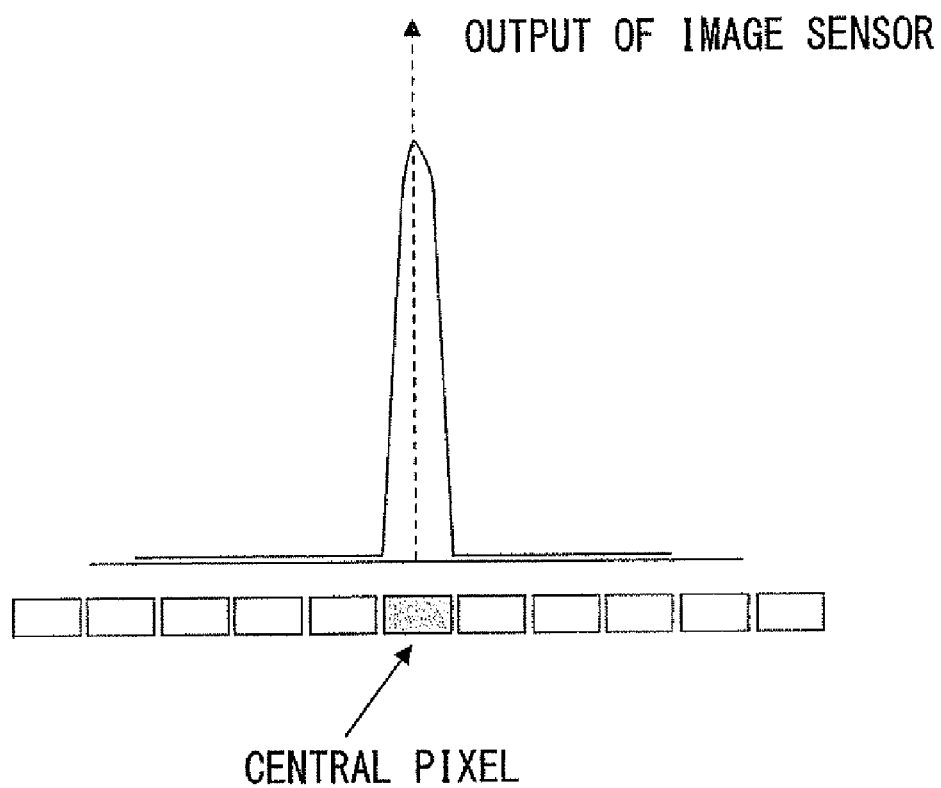
FIG. 5 illustrates the output of the image sensor of a conventional imaging apparatus.
Figure 7:
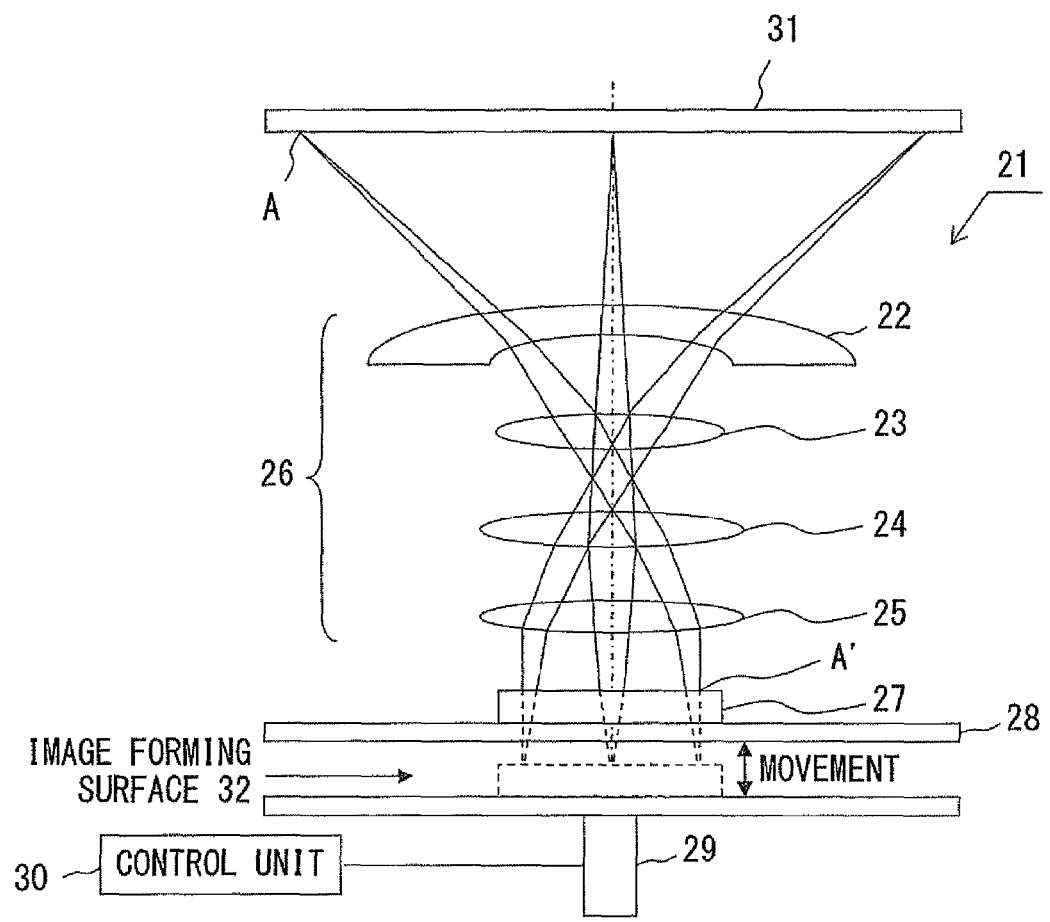
FIG. 7 illustrates a configuration of the imaging apparatus according to the first embodiment of the present invention.

The preferred embodiments of the present invention are described below. FIG. 7 illustrates a configuration of an imaging apparatus 21 for reading information according to the first embodiment of the present invention.

The imaging apparatus 21 for reading information can be used in a bar code reader for reading a 1- or 2-dimensional bar code, a living body authentication device for reading a fingerprint, a vein, etc. Since a clear image can be obtained by setting the position of an image sensor 27 as an image forming position, it can be used also in a normal image shooting device.

The first embodiment of the present invention relates to an image-side telecentric optical system in which the light from a lens to an image sensor is parallel to the optical axis, and is an example of the case where the image sensor 27 moves from the image forming surface to lense 25.

The imaging apparatus 21 for reading information includes a lens module 26 having a plurality of lenses 22 through 25, a 2-dimensional image sensor 27, a printed circuit board 28 on which the image sensor 27 is implemented, an actuator 29 for moving the printed circuit board 28 in the optical axis direction (Z axis direction) of the lens module 26, and a control unit 30 for controlling the actuator 29. The actuator 29 is, for example, the piezoactuator 29 with a piezo-element. Hereinafter, the actuator 29 is referred to as a piezo actuator 29.

The printed circuit board 28 on which the image sensor 27 is implemented can be moved in the optical axis direction (in the perpendicular direction illustrated in FIG. 7) of the lens module 26 by the piezo actuator 29.

The position of the image sensor 27 indicated by the dotted lines in FIG. 7 is the position where the light-receptive surface of the image sensor 27 matches an image forming surface (image forming position) 32 of the lens module 26. The position indicated by the solid lines is the position where the printed circuit board 28 is lifted perpendicularly in the upper direction by the piezo actuator 29, and the light-receptive surface of the image sensor 27 is placed in front of the image forming surface 32 of the lens module 26.

By moving the image sensor 27 upward in the optical axis, the spread size (the size of light power distribution) of an image at the point A' of the light-receptive surface of the image sensor 27 can be changed.

FIG. 8 illustrates a configuration of an imaging apparatus 41 for reading information according to the second embodiment of the present invention. In the second embodiment, the moving direction of the image sensor 27 is the farther direction (backward the image forming surface) from the image forming surface 32 of the lens module 26. Only this moving direction of the image sensor 27 is the difference between the first and the second embodiments.

The imaging apparatus 41 for reading information is configured by the lens module 26 having a plurality of lenses 22 through 25 and the image sensor 27. Although not illustrated in FIG. 8, the image sensor 27 is implemented on a printed circuit board and has an actuator for moving the printed circuit board in the optical axis direction of the lens and a control unit.

In the first and second embodiments, the relationship between the position of the image sensor 27 and the image forming surface when the image sensor 27 is moved in the optical axis direction of the lens module 26 and the power density of the vicinity of the target point of the image sensor 27 are described below with reference to FIGS. 9A and 9B.

FIG. 9A illustrates a position A by dotted lines when the light-receptive surface of the image sensor 27 is in the position of the image forming surface 32 of the lens, a position B by dotted lines when the light-receptive surface of the image sensor 27 is above the image forming surface 32, and a position C by solid lines when the image sensor 27 is above the position B. When the image sensor 27 is at the position C, the light from the object 31 to be shot spreads on the image sensor 27 more than when image sensor 27 is at the position B.

FIG. 9A illustrates the state of a formed image of light from one point of the object 31 to be shot, but such an image is formed by every light flux from each point of the object 31 to be shot.

The power density distribution (W/m$^2$) of the received light of the vicinity of a target point on the image sensor 27 when the image sensor 27 is at each position of A, B, and C illustrated in FIG. 9A is expressed by a (x, y), b (x, y), and c (x, y) in FIG. 9B.

The central axis in FIG. 9B indicates any target point on the image sensor 27, and x, y indicates the distance from the target point as an origin to the peripheral pixel. Since the power density distribution can be regarded as substantially symmetrical about the axis (to be strict, it is not symmetrical), the distribution can be expressed by the function of a radius r from the target point.

The output of each pixel of the image sensor 27 is proportional to the value obtained by multiplying the power (W) of incident light by the exposure time (second), that is, the exposure energy. Assuming that the exposure time at each of the positions A, B, and C in FIG. 9A is ta, tb, and tc (second) respectively, the output distribution F (x, y) of the pixel of the point (coordinates x, y) of the target point can be expressed by the following equation.

$$F(x,y)=a(x,y) \times ta + b(x,y) \times tb + c(x,y) \times tc$$

The equation above clearly indicates that arbitrary output distribution can be obtained by appropriately selecting the position in the optical axis direction (Z axis direction) of the image sensor 27 and the exposure time.

The a (x, y), b (x, y), or c (x, y) above is the power density distribution of the point image (the image of one point on the object to be shot) on the image sensor 27, and can be obtained by a strict optical system simulation. Otherwise, it can be empirically obtained using the measurement system illustrated in FIG. 10.

Figure 10:
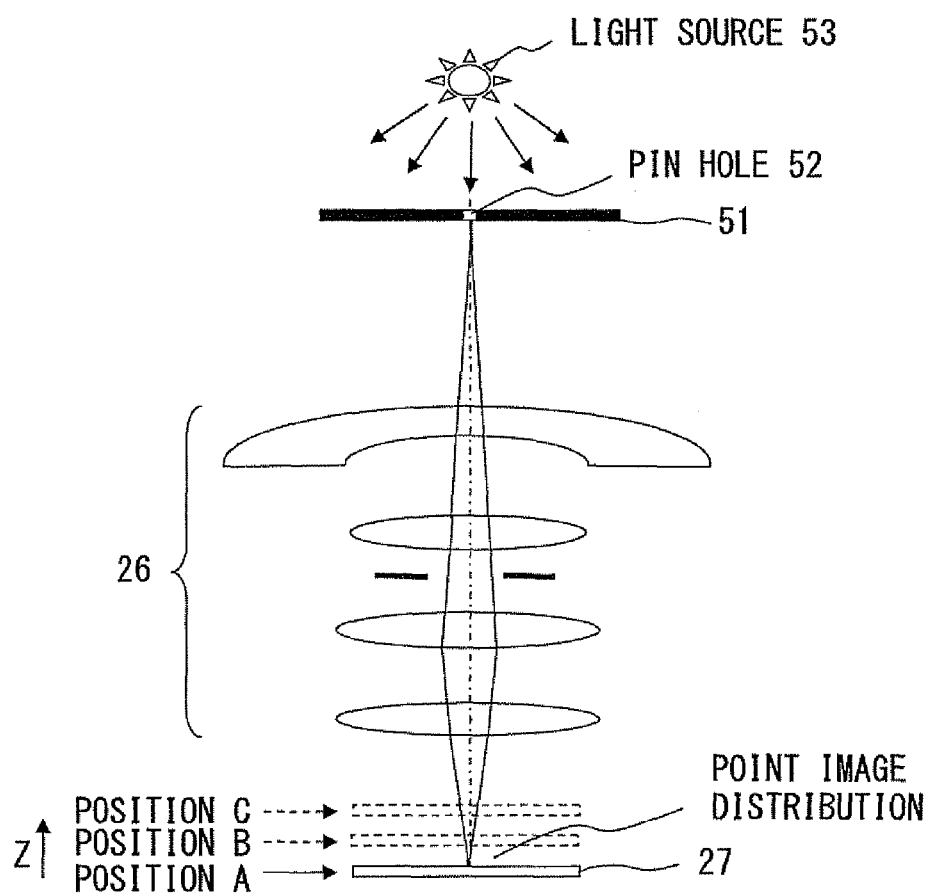
FIG. 10 illustrates a system of measuring a power density distribution of a point image.

FIG. 10 illustrates the measurement system for measuring the power density distribution of the image (point image) on the image sensor 27 using the lens module 26 according to the first embodiment of the present invention.

In the measurement system in FIG. 10, the power density distribution a (x, y), b (x, y), and c (x, y) in each position illustrated in FIG. 9B can be empirically obtained by moving the image sensor 27 upward in the optical axis direction and measuring the output distribution in the vicinity of any target point of the image sensor 27 in each position of the positions A, B and C.

The above-mentioned power density distribution is measured in advance to determine the exposure time ta, tb, and tc for the respective distributions for obtaining the target filter function F (x, y).

In the example above, the energy density distribution centering one point on the image sensor 27 corresponding to one point of the object 31 to be shot is described for simple explanation. However, the output distribution F (x, y) can be obtained for every pixel on the image sensor 27 centering on itself by changing the position of the pinhole 52 on the light shield plate 51 in FIG. 10. Although the distribution F(X,Y) at the center portion and F(X,Y) at peripheral portion are not strictly the same, they are similar and hereafter they are regarded as the same.

Figure 11:
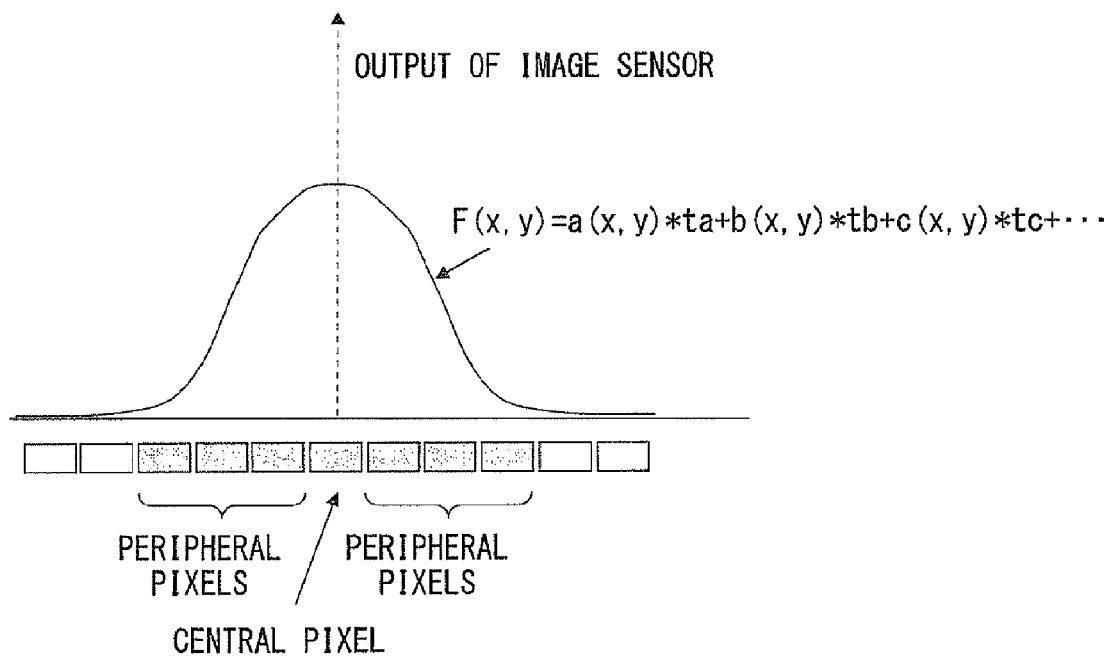
FIG. 11 illustrates the output distribution of an image sensor when the position in the Z axis direction and the exposing time are controlled.

FIG. 11 illustrates the output distribution of the image sensor 27 when the position in the Z axis direction and the exposure time are controlled. FIG. 11 illustrates the case of the Gaussian distribution.

Since the output of the image sensor 27 can be expressed by F (x, y)=a (x, y)×ta+b (x, y)×tb+c (x, y)×tc, the output characteristic of the Gaussian distribution illustrated in FIG. 11 can be obtained by appropriately setting the position in the Z axis direction of the image sensor 27 and the exposure time. Since this output distribution can be obtained on all pixels of the image sensor 27, the convolution of the image of the object to be shot and the output distribution illustrated in FIG. 11 can be optically performed, thereby the Gaussian low pass filter can be realized.

Figure 12:
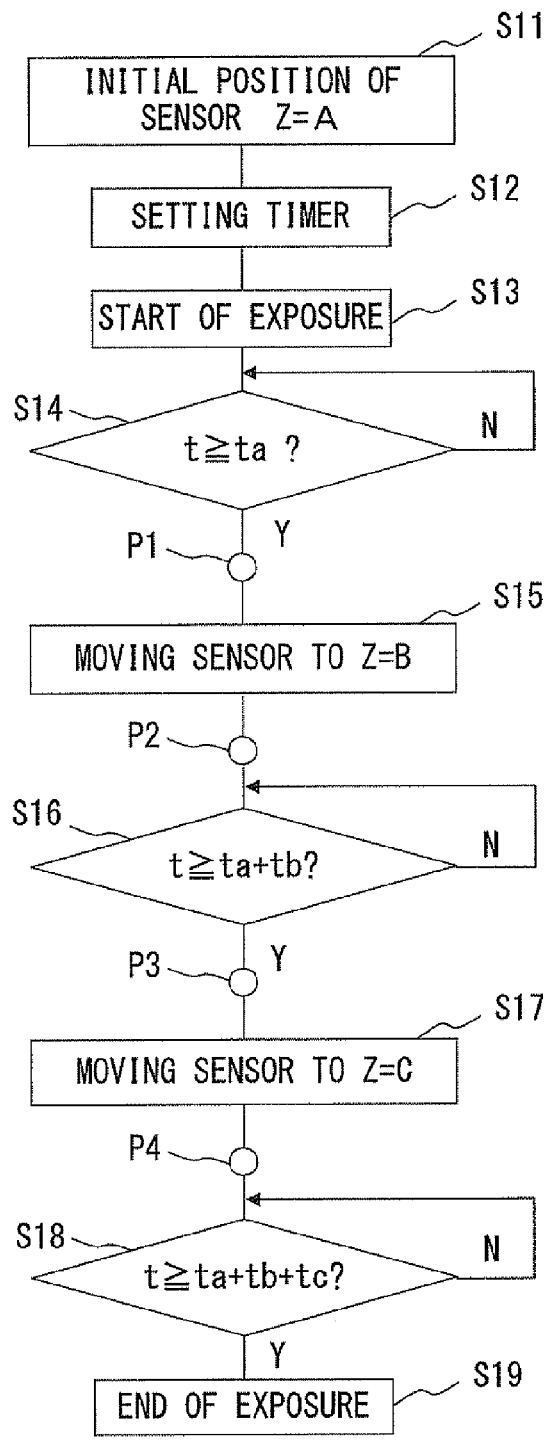
FIG. 12 is a flowchart of control according to the first embodiment of the present invention.

FIG. 12 is a flowchart of control according to the first embodiment of the present invention. The process performed when the piezo actuator 29 is controlled so that the output distribution of the image sensor 27 according to the first embodiment can be expressed by the Gaussian distribution is described below with reference to FIG. 12. The following process is performed by the control unit 30 of the imaging apparatus 21 for reading information.

The image sensor 27 is moved to the initial position Z=A (position A in FIG. 9A) by driving the piezoactuator 29 (S11 in FIG. 12).

The timer is reset (S12), and the exposure of the image sensor 27 is started at the position A (S13).

Next, it is determined whether or not the counting time t of the timer is equal to or exceeds ta (S14). In step S14, when it is determined that the counting time of the timer falls short of ta (NO in S14), the exposure is continued, and the determination in step S14 as to whether or not the counting time of the timer in step S14 is equal to or exceeds ta is repeated.

If it is determined in step S14 that the counting time t of the timer is equal to or exceeds ta (YES in S14), control is passed to step S15, the piezoactuator 29 is driven to move the image sensor 27 to the position Z=B (position B in FIG. 9A).

Until the counting time t of the timer is equal to ta by the process in step S11 through S14, that is, for the time ta at the position A, the exposure of the image sensor 27 can be performed. Thus, the power density distribution of any target pixel of the image sensor 27 and the peripheral pixels can be the power density distribution a (x, Y) in FIG. 9B.

Next, it is determined whether or not the counting time t of the timer is equal to or exceeds ta+tb (S16). If it is determined n step S16 that the counting time t falls short of ta+tb (NO in S16), the determination in step S16 is repeated.

On the other hand, if it is determined in step S16 that the counting time t of the timer is equal to or exceeds ta+tb (YES in S16), control is passed to step S17 to drive the piezoactuator 29 and move the image sensor 27 to the position Z=C (position C in FIG. 9A).

By the process in steps S15 and S16, the exposure of the image sensor 27 is performed for the time tb at the position B. Thus, the power density distribution of the target point of the image sensor 27 and the peripheral pixels can be the power density distribution b (x, y) in FIG. 9B.

Next, it is determined whether or not the counting time t of the timer is equal to or exceeds ta+tb+tc (total exposing time) (S18).

If it is determined in step S18 that the counting time of the timer falls short of ta+tb+tc (NO in S18), the exposure is continued at the position, and the determination in step S18 is repeated.

On the other hand, if it is determined in step S18 that the counting time t of the timer is equal to or exceeds ta+tb+tc (YES in S18), that is, if the exposure for the time determined for each of the positions A, B, and C, then control is passed to step S19, and the exposure terminates.

By the process in steps S17 through S18, the exposure of the image sensor 27 is performed at the position C for the time tc. Thus, the power density distribution of the target pixel of the image sensor 27 and its peripheral pixels can be expressed by the power density distribution c (x, y) in FIG. 9B.

When the time required to move the image sensor 27 cannot be ignored with respect to the exposing time, the exposure is suspended at the time P1 at which the counting time t of the timer reaches ta in step S14. Then, after moving the image sensor 27 from the position A to the position B, the exposure and the count of the timer are resumed at the time P2. Similarly, in step S16, the exposure is suspended at the time P2 at which the counting time of the timer reaches ta+tb, and the count of the timer is suspended. Then, after moving the image sensor 27 from the position B to the position C, the exposure and the count of the timer are resumed at the time P4. Thus, although the moving time cannot be ignored, the exposure time at each position can be correctly controlled.

In the above-mentioned process, the position of the image sensor 27 is moved by the piezoactuator 29 in the Z axis direction (optical axis direction), and the exposure is performed at each position for a predetermined time (for example, ta, tb, and tc), thereby assigning arbitrary low pass filter characteristic (for example, the characteristic of the Gaussian distribution) as the output distribution of each pixel and the peripheral pixels of the image sensor 27. That is, the low pass filter process can be optically realized instead of the arithmetic process of the low pass filter illustrated in FIGS. 6A and 6B.

According to the above-mentioned first and second embodiments, the position in the optical axis direction of the image sensor 27 or the printed circuit board 28 with the image sensor 27 is changed, and the exposure time at each position is controlled, thereby arbitrarily changing the range of the light from each point of the object 31 to be shot on the image sensor 27. Thus, the low pass filter process can be optically realized on the output signal of the image sensor 27. As a result, the conventional low pass filter operation is not required, thereby shortening the processing time of the image processing. In addition, since the process load of the image processing can be reduced, a less expensive CPU of a relatively low processing speed can be used, thereby reducing the cost of the imaging apparatus for reading information.

In the examples above, the exposure time of the image sensor 27 is controlled at three positions, but the exposure time can be controlled at three or more positions. If the number of positions is increased, a low pass filter having more smooth characteristic can be realized.

In addition, in the examples above, the exposure is performed with the image sensor 27 stopped at the three positions (positions A, B, and C), but the substantial exposure time can be controlled at each position by continuously changing the position of the image sensor 27 and controlling the moving speed. In this case, if the power density distribution is expressed by the functions of not only x and y, but also z, the power density distribution changing with the movement in the Z axis direction is expressed by a function into $f(x, y, z)$ (w/m$^2$), the moving speed is expressed by a function of z as $V(z)$, the movement range is set as $Z=0$ (image forming surface) through $Z=Z_0$, then the output distribution $F(x, y)$ of the image sensor 27 can be expressed by the following equation.

$$F(x,y)=\int (f(x,y,z)\times 1/V(z))dz \text{ (the integral range is } 0 \sim Z_0)$$

The moving speed $V(z)$ in the Z axis direction is obtained so that $F(x, y)$ can be a desired distribution, for example, the Gaussian distribution, and the piezoactuator 29 can be controlled for the moving speed $V(z)$.

In this case, as with the above-mentioned first and second embodiments, $f(x, y, z)$ can be obtained by a strict optical simulation. Otherwise, the power density distribution for the position in the Z direction can be measured using the measuring system in FIG. 10. In this example, the moving speed $V(z)$, that is, the fast or slow movement of the image sensor 27 can be a parameter for determining the filter characteristic. Therefore, the filter characteristic can be more freely determined.

Figure 13:
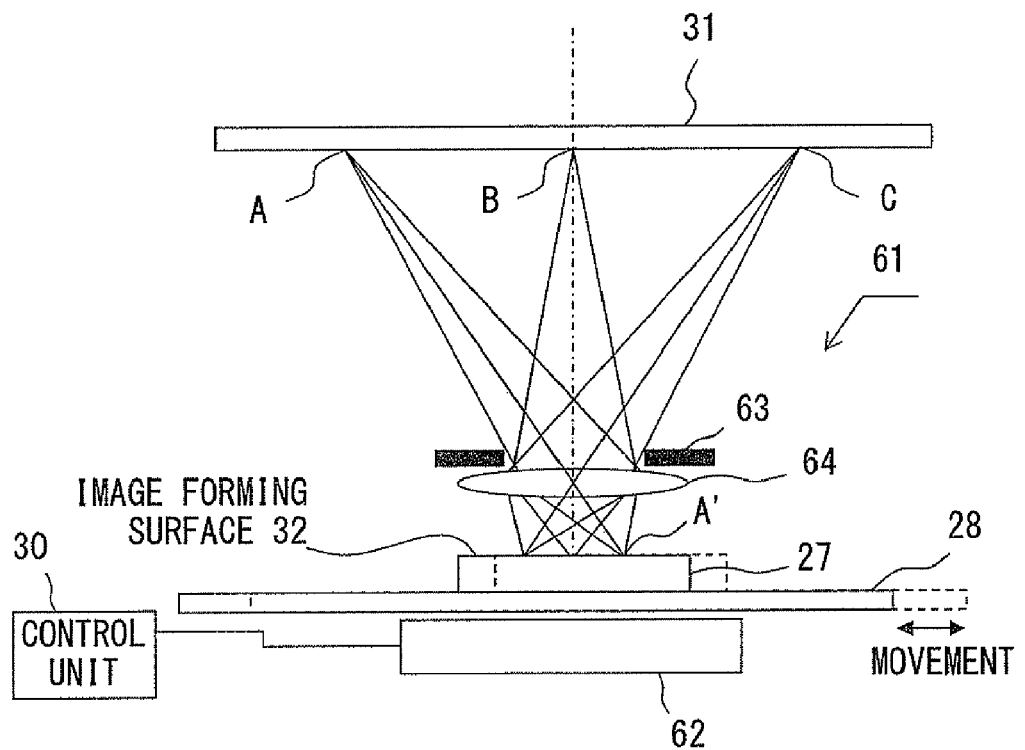
FIG. 13 illustrates a configuration of the imaging apparatus according to the third embodiment of the present invention.

FIG. 13 illustrates a configuration of an imaging apparatus 61 for reading information according to the third embodiment of the present invention. The third embodiment is an example of the case in which the image sensor 27 is moved on the XY plane orthogonal to the optical axis of the lens to obtain a desired filter characteristic.

The imaging apparatus 61 for reading information includes an iris 63, a lens 64, the image sensor 27 implemented on the printed circuit board 28, an X-Y stage 62 for moving the printed circuit board 28 on the XY plane, and the control unit 30 for controlling the X-Y stage 62. The X-Y stage 62 has a piezoactuator etc. not illustrated in FIG. 13 and a mechanical drive mechanism, and is moved in the X and Y axis directions by the driving force of the actuator.

In the third embodiment, the light-receptive surface of the image sensor 27 and the image forming surface 32 match each other, and the light at the point A of the object 31 to be shot forms an image at one point (A') of the light-receptive surface of the image sensor 27. The light of any other points of the object 31 to be shot similarly forms an image. In the third embodiment, the image sensor 27 moves on the XY plane. Therefore, the size of an image in the image sensor 27 is constant. Accordingly, an image-side telecentric optical system is not necessary.

In the third embodiment, the X-Y stage 62 is moved on the XY plane, and the exposure time $t(x, y)$ of the target pixel $(x, y)$ and its peripheral pixels is controlled. Thus, a low pass filter of a desired characteristic can be realized.

FIGS. 14A and 14B illustrate the XY moving control to realize a singular point removal filter and the characteristic of a singular point removal filter.

Assume that the X-Y coordinates of the central pixel (target pixel) $a_0$ in FIG. 14A are $(0, 0)$, the horizontal direction of FIG. 14A is the right direction of X, and the vertical direction is the Y direction.

When the exposure is performed with the X-Y stage 62 moved clockwise pixel by pixel by setting as the starting point the position in which the pixel $(1, 1)$ at the upper right of the central pixel $a_0$ is the center, the filter characteristic illustrated in FIG. 14B is obtained.

Since the exposure is not performed at the central pixel $a_0$, the exposure energy of the central pixel $a_0$ is 0. By performing the exposure of the eight pixels at the upper right, right adjacent, lower right, . . . of the central pixel $a_0$, the singular point removal filter for removing an image at a specific point of the object 31 to be shot can be realized.

The contents of the process performed when the singular point removal filter are described below with reference to the flowchart illustrated in FIG. 15. The following processes are performed by the control unit 30. The movement of the image sensor 27 and the exposure at all positions are performed within the appropriate one time exposure time to capture the ordinary static image of the object 31 to be shot.

Figure 15:
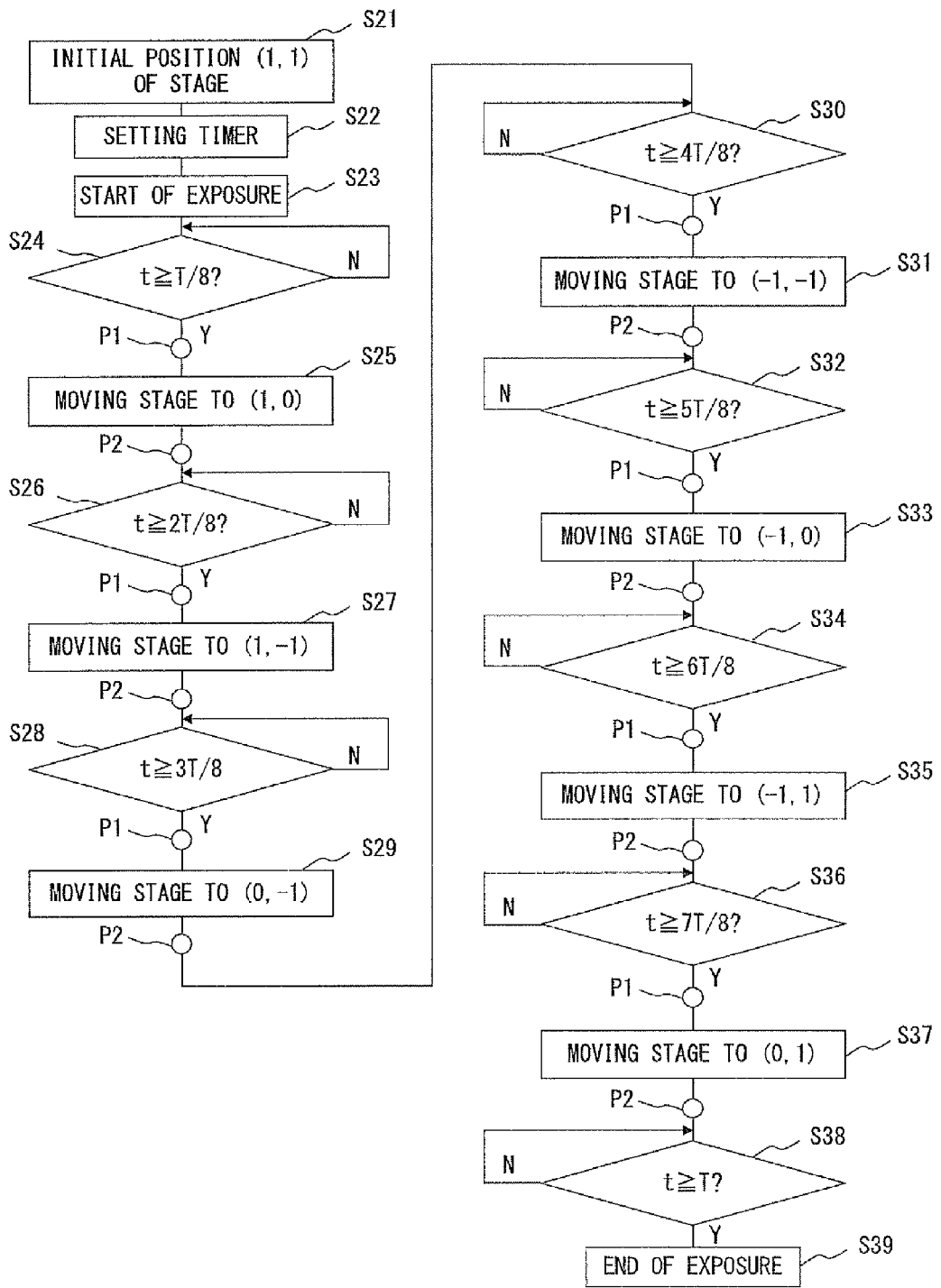
FIG. 15 is a flowchart of control according to the third embodiment of the present invention.

The initial position $(x, y)$ of the X-Y stage 62 is moved to the position where the pixel $(1, 1)$ is centered (S21 in FIG. 15). The pixel $(1, 1)$ is the pixel in the position $(1, 1)$ at the upper right of the central pixel $a_0$ $(0, 0)$ in FIG. 14A.

If the X-Y stage 62 is moved to the initial position, the count of the timer is started (set) (S22), and the exposure is started at the position (S23).

Next, it is determined whether or not the counting time t of the timer is equal to or exceeds T/8 (S24). The time T is the total exposure time of the eight peripheral pixels around the central pixel $a_0$ in FIG. 14A, and 1/8 of the total exposure time T is set as the exposure time of each pixel.

If it is determined in step S24 that the counting time t of the timer is T/8 (NO in step S24), the determination in step S24 is repeated.

On the other hand, if it is determined in step S24 that the counting time t of the timer has reached T/8 (YES in S24), control is passed to step S25, and the position $(x, y)$ of the X-Y stage 62 is moved to the position where the pixel $(1, 0)$ is centered. The pixel (1, 0) is a pixel at the position (1, 0) to the right of the central pixel $a_0$ in FIG. 14A.

If the time required to move the X-Y stage 62 cannot be ignored with respect to the exposure time at each position, the exposure and the count of the timer are suspended at the time P1 at which the exposure time reaches T/8, the X-Y stage 62 is moved to the position where the pixel (1, 0) is centered, and then the exposure and the count of the timer are resumed at the time P2. Thus, although it takes a long time in moving the X-Y stage 62, the exposure time of each pixel can be correctly controlled, and a desired filter characteristic can be realized.

In the same manner, if the moving time of the X-Y stage 62 cannot be ignored with respect to the exposure time in the following steps, then the exposure and the count of the time are suspended before (at the time P1) the exposure at one position is terminated and the X-Y stage 62 is moved to the next position, and exposure and the count of the timer are resumed after the completion of the movement (at the time P2), thereby removing the influence of the time required to move the X-Y stage 62.

Next, it is determined whether or not the counting time t of the timer is equal to or exceeds 2T/8 (S26). Assuming that the time required to move the X-Y stage 62 can be ignored with respect to the exposure time, the exposure at this position can be terminated when the counting time t of the timer reaches the total time 2T/8, that is, the sum of the exposure time of the first pixel (1, 1) and the exposure time of the second pixel (1, 0). In the process in step S26, it is determined whether or not the counting time t of the timer has reached the total exposure time 2T/8 of two pixels.

If it is determined in step S26 that the counting time t of the timer falls short of 2T/8 (NO in step S26), then the process in step S26 is repeated.

On the other hand, if it is determined in step S26 that the counting time t of the timer has reached 2T/8 (YES in step S26), control is passed to step S27, and the X-Y stage 62 is moved to the position where the pixel (1, −1) is centered. The pixel (1, −1) is a pixel at the position (1, −1) at the lower right of the central pixel $a_0$ (0, 0).

Next, it is determined whether or not the counting time t of the timer is equal to or exceeds 3T/8 (S28). The process in step S28 is the process of determining whether or not the exposure time of the pixel (−1, −1) has reached T/8.

In step S28, if it is determined that the counting time t of the timer falls short of 3T/8 (NO in S28), the process in step S28 is repeated.

On the other hand, if it is determined in step S28 that the counting time t of the timer has reached 3T/8 (YES in S28), then control is passed to step S29, and the X-Y stage 62 is moved to the position where the pixel (0, −1) is centered. The pixel (0, −1) is a pixel at the position (0, −1) one pixel below the central pixel $a_0$ in FIG. 14A.

Next, it is determined whether or not the counting time t of the timer is equal to or exceeds 4T/8 (S30). The process is performed to determine whether or not the exposure time of the pixel (0, −1) has reached T/8.

If it is determined in step S30 that the counting time t of the timer falls short of 4T/8 (NO in S30), the process in step S30 is repeated.

On the other hand, if it is determined in step S30 that the counting time t of the timer has reached 4T/8 (YES in S30), control is passed to step S31, and the X-Y stage 62 is moved to the position where the pixel (−1, −1) is centered. The pixel (−1, −1) is the pixel at the position (−1, −1) at the lower left of the central pixel $a_0$ in FIG. 14A.

Next, it is determined whether or not the counting time t of the timer is equal to or exceeds 5T/8 (S32). The process is performed to determine whether or not the exposure time of the pixel (−1, −1) has reached T/8.

If it is determined in step S32 that the counting time t of the timer falls short of 5T/8 (NO in S32), the process in step S32 is repeated.

On the other hand, if it is determined in step S32 that the counting time t of the timer is equal to or exceeds 5T/8 (YES in S32), control is passed to step S33, and the X-Y stage 62 is moved to the position where the pixel (−1, 0) is centered. The pixel (−1, 0) is a pixel at the position (−1, 0) left adjacent to the central pixel $a_0$ in FIG. 14A.

Next, it is determined whether or not the counting time t of the timer is equal to or exceeds 6T/8 (S34). The process is performed to determine whether or not the exposure time of the pixel (−1, 0) has reached T/8.

If it is determined in step S34 that the counting time t of the timer falls short of 6T/8 (NO in S34), the process in step S34 is repeated.

If it is determined in step S34 that the counting time t of the timer is equal to or exceeds 6T/8 (YES in S34), control is passed to step S35, and the X-Y stage 62 is moved to the position where the pixel (−1, 1) is centered. The pixel (−1, 1) is the pixel at the position (−1, 1) at the upper left of the central pixel $a_0$ in FIG. 14A.

Next, it is determined whether or not the counting time t of the timer is equal to or exceeds 7T/8 (S36). The process is performed to determine whether or not the exposure time of the pixel (−1, 1) has reached T/8.

If it is determined in step S36 that the counting time t of the timer falls short of 7T/8 (NO in S36), then the process in step S36 is repeated.

On the other hand, if it is determined in step S36 that the counting time t of the timer is equal to or exceeds 7T/8 (YES in S36), control is passed to step S37, and the X-Y stage 62 is moved to the position where the pixel (0, 1) is centered. The pixel (0, 1) is a pixel at the position (0, 1) one pixel above the central pixel $a_0$ in FIG. 14A.

Next, it is determined whether or not the counting time t of the timer is equal to or exceeds T (S38). The process is performed to determine whether or not the exposure time of the pixel (0, 1) has reached T/8.

If it is determined in step S38 that the counting time t of the timer falls short of T (NO in S38), the process in step S38 is repeated.

On the other hand, if it is determined in step S38 that the counting time t of the timer is equal to or exceeds T (YES in S38), control is passed to step S39, and the exposure is terminated.

In the above-mentioned process, a singular point removal filter for removing an image at an arbitrary point of the object 31 to be shot can be realized by performing the exposure of the peripheral pixels and controlling the X-Y stage 62 not to expose the central pixel.

The above-mentioned process is realized by controlling the position on the XY plane of the image sensor 27, and it is not necessary to perform the image processing for removing a singular point from an output image of the image sensor 27 by arithmetic operations. Therefore, the processing time of the image processing can be shortened. Thus, since the arithmetic process of a singular point removal filter etc. is not required, a less expensive CPU having a relatively low processing speed can be used. Thus, the cost of the imaging apparatus for reading information to be treated in real-time processing, for example, a bar code reader, a living body authentication device, etc. can be reduced.

The above-mentioned process relates to eight peripheral pixels around the central pixel $a_0$, but the number of pixels is not limited to eight, that is, seven or less, or nine or more pixels can be processed.

In the process in FIG. 15, a singular point removal filter is realized by controlling the X-Y stage 62 not to receive the light of any point of object 31 to be shot at the central pixel $a_0$, but the above-mentioned controlling method can be applied to a low pass filter having any characteristics other than those of the singular point removal filter.

For example, the X-Y stage 62 is moved to the position where the central pixel $a_0$ is centered so that the exposure time of the central pixel $a_0$ can be the longest (>T). Then, the X-Y stage 62 is moved to the position where the peripheral pixels on the concentric circles are centered, the exposure time of the pixels on the same concentric circle is made shorter than that of the central pixel $a_0$, and the exposure time of the pixels on the outside concentric circle (second concentric circle) is made further shorter. Thus, a desired low pass filter characteristic (for example, the Gaussian filter illustrated in FIG. 11) can be applied to the light entering the image sensor 27. As the exposure time at each pixel position, for example, the time can be set depending on the value of an operation matrix of the Gaussian filter in FIG. 6.

According to the above-mentioned embodiment, the imaging apparatus for reading information requires no low pass filter operation on an image, thereby shortening the processing time in image processing. Thus, for example, a less expensive CPU having a relatively low processing speed can be used. Accordingly, the cost of the apparatus can be reduced.

In all embodiments described above, the move of the image sensor is controlled to make a specific exposure energy distribution. Since all pixels move simultaneously, the resultant output of the image sensor is the convolution of a specific exposure energy distribution and an image signal, and thereby a low pass filter can be optically performed. This concept is common in all embodiments.

The present invention is not limited to the above-mentioned embodiments. For example, the following configuration can be realized.

(1) In the above-mentioned first and second embodiments, the position of the image sensor 27 is changed in the Z axis direction while in the third embodiment the position of the image sensor 27 is changed on the XY plane. However, the position of the image sensor 27 can be simultaneously changed in the X, Y and Z axis directions by combining the first, second, and third embodiments. In this case, a more smooth filter characteristic can be obtained.

(2) In the first through third embodiments, the image sensor 27 is moved using a piezoactuator. However, the drive unit is not limited to a piezoactuator, but can be a motor or other electric and magnetic drive device and a mechanical drive mechanism etc.

(3) Not only the position of the image sensor 27 implemented on a printed circuit board is controlled, but also the position of the image sensor 27 can be controlled directly by a drive unit.

What is claimed is:

1. An imaging apparatus for reading information comprising:
   a lens for forming an image of light from an object to be shot;
   an image sensor for receiving the light from which an image is formed by the lens;
   a drive unit for changing a position of the image sensor so that an exposure energy of received light of each pixel of the image sensor can be a low pass filter characteristic; and
   a control unit for controlling the drive unit, wherein
   the control unit uses the drive unit to move the image sensor in an optical axis direction of the lens, and controls an exposure time in a plurality of positions in front of or in back of an image forming position of the lens, thereby obtaining a desired low pass filter characteristic.

2. The apparatus according to claim 1, wherein
   the control unit uses the drive unit to move the image sensor on an XY plane orthogonal to an optical axis of the lens, and controls a position of the image sensor and an exposure time at the position of the image sensor so that an exposure energy of received light of a target pixel of the image sensor can be maximum and an exposure energy of received light of peripheral pixels of the target pixel can gradually decrease, thereby obtaining a desired low pass filter characteristic.

3. The apparatus according to claim 2, wherein
   the drive unit has a stage for moving the image sensor on the XY plane.

4. The apparatus according to claim 1, wherein
   the control unit uses the drive unit to move the image sensor on an XY plane orthogonal to an optical axis of the lens, and controls a position of the image sensor and an exposure time at the position of the image sensor so that an power of received light of a target pixel of the image sensor can be minimum and an exposure energy of received light of peripheral pixels of the target pixel can be larger than the exposure energy of received light of the target pixel, thereby obtaining a desired low pass filter characteristic.

5. The apparatus according to claim 1, wherein
   the control unit controls an optical axis direction of the image sensor or a position on a plane orthogonal to an optical axis and an exposure time so that a distribution of an exposure energy of received light in which a target pixel of the image sensor is centered becomes a Gaussian distribution.

6. The apparatus according to claim 1, wherein
   the drive unit is a piezoactuator.

7. The apparatus according to claim 1, wherein
   the lens is a lens module comprising a plurality of lens units.

* * * * *